US009995397B2

(12) United States Patent
Miller

(10) Patent No.: US 9,995,397 B2
(45) Date of Patent: Jun. 12, 2018

(54) COATED SEAL HOUSING

(71) Applicant: United Technologies Corporation, Farmington, CT (US)

(72) Inventor: Jonathan Logan Miller, Ware, MA (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/208,035

(22) Filed: Jul. 12, 2016

(65) Prior Publication Data

US 2018/0017165 A1     Jan. 18, 2018

(51) Int. Cl.

| F16J 15/3284 | (2016.01) |
|---|---|
| C23C 4/00 | (2016.01) |
| C23C 4/18 | (2006.01) |
| F01D 11/04 | (2006.01) |
| F01D 25/18 | (2006.01) |
| F16J 15/24 | (2006.01) |
| F16J 15/56 | (2006.01) |

(52) U.S. Cl.
CPC ............. *F16J 15/3284* (2013.01); *C23C 4/00* (2013.01); *C23C 4/18* (2013.01); *F01D 11/04* (2013.01); *F01D 25/183* (2013.01); *F16J 15/24* (2013.01); *F16J 15/56* (2013.01)

(58) Field of Classification Search
CPC .. F16J 15/3284; F16J 15/3464; F16J 15/3268; F16J 15/6248; F16J 15/6252
See application file for complete search history.

(56) References Cited

U.S. PATENT DOCUMENTS

| 1,181,618 A | 5/1916 | Smith |
|---|---|---|
| 1,532,938 A | 4/1925 | Peeler |
| 1,635,407 A | 7/1927 | Grover |
| 2,068,042 A | 1/1937 | Teetor |
| 2,386,873 A | 10/1945 | Mercier |
| 2,917,329 A | 12/1959 | Laser |
| 3,655,208 A | 4/1972 | Walker |

(Continued)

FOREIGN PATENT DOCUMENTS

| EP | 3037570 A1 | 6/2016 |
|---|---|---|
| GB | 2264541 A | 9/1993 |

(Continued)

OTHER PUBLICATIONS

Extended European Search Report for EP Application No. 17180315.8, dated Nov. 24, 2017, 7 pages.

*Primary Examiner* — Gilbert Y Lee
(74) *Attorney, Agent, or Firm* — Kinney & Lange, P.A.

(57) ABSTRACT

A seal housing is disposed to support an axially facing seal segment, and comprises a substrate and a coating. The substrate has an inner annular surface, an axially facing substrate surface, and a corner feature at an intersection of the inner annular surface and the axially facing substrate surface. The corner feature includes an annular notch in the inner annular surface, and a chamfer extending from the annular notch to the axially facing substrate surface. The coating is formed on the axially facing substrate surface and into the corner feature of the substrate, and has a coating surface, parallel to the axially facing substrate surface, that terminates at the inner annular surface and abuts the seal segment.

18 Claims, 3 Drawing Sheets

(56) References Cited

U.S. PATENT DOCUMENTS

| | | | |
|---|---|---|---|
| 4,185,843 A * | 1/1980 | Beyer | F16J 9/26 277/441 |
| 4,189,161 A | 2/1980 | Grimm | |
| 4,256,318 A | 3/1981 | Bush | |
| 4,526,387 A | 7/1985 | Flower | |
| 4,575,107 A | 3/1986 | Umegawa | |
| 4,844,487 A | 7/1989 | Eakin | |
| 5,056,935 A | 10/1991 | Singh | |
| 5,178,400 A | 1/1993 | Singh | |
| 5,253,878 A | 10/1993 | Miura | |
| 5,292,138 A | 3/1994 | Glynn et al. | |
| 5,344,162 A | 9/1994 | Kernon et al. | |
| 5,660,398 A | 8/1997 | Terao et al. | |
| 5,713,578 A | 2/1998 | Terao et al. | |
| 5,934,680 A | 8/1999 | Kakehi et al. | |
| 6,962,343 B2 | 11/2005 | Abiko | |
| 7,217,081 B2 | 5/2007 | Scheurien et al. | |
| 7,341,256 B2 | 3/2008 | Nakaoka et al. | |
| 7,431,504 B1 | 10/2008 | Pelfrey | |
| 7,654,536 B2 | 2/2010 | Umetsu et al. | |
| 7,722,051 B2 | 5/2010 | Umetsu et al. | |
| 7,766,339 B2 | 8/2010 | Umetsu et al. | |
| 2004/0046329 A1 | 3/2004 | Pieters | |
| 2004/0226547 A1 | 11/2004 | Holzleitner et al. | |
| 2008/0025855 A1 | 1/2008 | Alaze et al. | |
| 2008/0277882 A1 | 11/2008 | Kyohei et al. | |
| 2010/0164179 A1 | 7/2010 | Hirakawa et al. | |
| 2012/0112415 A1 | 5/2012 | Benjamin et al. | |
| 2016/0319937 A1 * | 11/2016 | Stirnemann | F16J 15/3268 |

FOREIGN PATENT DOCUMENTS

| | | |
|---|---|---|
| GB | 2453231 A | 4/2009 |
| JP | 10183327 A | 7/1998 |
| JP | H11325259 A | 11/1999 |
| WO | WO96/21116 A1 | 7/1996 |

* cited by examiner

COATED SEAL HOUSING

BACKGROUND

The present invention relates generally to bearing assemblies, and more particularly to a coated seal housing structure suitable for use in a gas turbine seal assembly.

Coated structures such as seal housings can have strict tolerances requiring even, sharply-angled corners. Coatings are applied to substrate surfaces, and delamination and irregularity of coating deposition can create imperfections in corners of the resulting coated structure. In seal assemblies, irregularities in corner location near intersections of facing parts can increase wear and/or introduce part failures. Some coated seal housings include chamfers at ID annular corners of substrates to reduce chipping and delamination. Chamfered substrate corners can produce irregularities in coated ID corner location that are harmful to adjacent components.

SUMMARY

In one aspect, the present invention is directed toward a seal housing disposed to support an axially facing seal segment. The seal housing comprises a substrate and a coating. The substrate has an inner annular surface, an axially facing substrate surface, and a corner feature at an intersection of the inner annular surface and the axially facing substrate surface. The corner feature includes an annular notch in the inner annular surface, and a chamfer extending from the annular notch to the axially facing substrate surface. The coating is formed on the axially facing substrate surface and into the corner feature of the substrate, and has a coating surface, parallel to the axially facing substrate surface, that terminates at the inner annular surface and abuts the seal segment.

In another aspect, the present invention is directed toward a method of forming an edge of an annular workpiece by fabricating a substrate, depositing coating material onto the substrate, and removing excess coating material beyond a target plane. The substrate is formed with an annular surface, an axially facing substrate surface, and a corner feature at the intersection of the annular surface and the axially facing substrate surface. The corner feature includes an annular notch in the annular surface, and a chamfer extending from the annular notch to the axially facing substrate surface. Coating material is spray deposited into the corner feature and on the axially facing substrate surface, axially out to at least a target plane parallel to the axially facing substrate surface. The coating is sprayed at a spray orientation obtuse to the axially facing substrate surface and at least an axial surface of the annular notch. Removing excess material beyond the target plane provides the coating with a uniform first axial thickness along the axially facing substrate surface, and a greater thickness within the corner feature.

In yet another aspect, the present invention is directed toward a seal assembly comprising a rotating shaft, a seal segment, and a seal housing. The seal segment is situated on and reciprocatable with the rotating shaft, and has an axially facing seal surface terminating at a first inner radial extent. The seal housing is situated adjacent the seal segment and around the rotating shaft, and comprises a substrate underlying a coated surface. The substrate terminates at a second inner radial extent inboard of the first inner radial extent, and has an annular notch at a corner adjacent the seal segment. The annular notch extends radially outward from the second inner radial extent, inboard and axially forward of a corner chamfer. The coated surface is deposited atop the substrate, covering the annular notch and the corner chamfer, abutting the axially facing seal surface, and terminating at the second inner radial extent.

The present summary is provided only by way of example, and not limitation. Other aspects of the present disclosure will be appreciated in view of the entirety of the present disclosure, including the entire text, claims, and accompanying figures.

Figure 1:
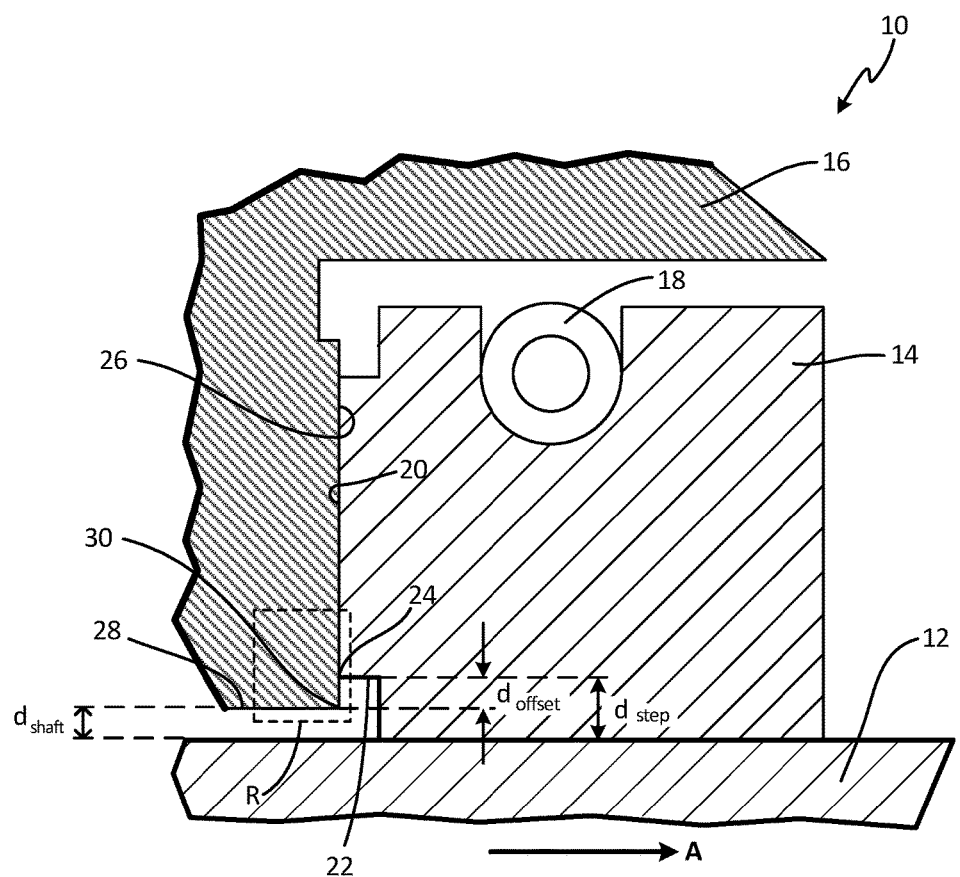
FIG. 1 is cross-sectional view of a seal assembly including a seal housing abutting a seal segment.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention provides a substrate structure for a coated annular corner. This substrate structure includes a corner feature with an annular notch situated between a corner chamfer and an uncoated surface. This notch encourages bonding of coating material at corner of the substrate, reducing circumferential variation in post-coat corner location and according reducing the risk of part failures due to malpositioning.

FIG. 1 is a cross-sectional view of seal assembly 10, which includes shaft 12, seal segment 14, and seal housing 16. Shaft 12 is a rotating element extending along axis A. Seal segment 14 includes spring 18, seal segment axially facing surface 20, segment step 22, and step corner 24. Seal housing 16 includes housing axially facing surface 26 and housing inner annular surface 28, which meet at housing inner diameter (ID) corner 30 in region R.

Seal segment 14 is a sealing element of a seal assembly, e.g. a shaft seal assembly of a gas turbine engine. Seal segment 14 is retained radially by spring 18, and rides shaft 12, reciprocating with runout of shaft 12. Seal segment 14 can, for example, be formed partially or entirely of carbon. Seal segment 14 abuts seal housing 16 axially at seal segment axially facing surface 20. In the illustrated embodiment, seal segment axially facing surface 20 transitions at an ID location into segment step 22 via step corner 24, such that step corner 24 defines the ID extent of seal segment axially facing surface 20 at its contact with seal housing 16. Seal segment is separated radially from seal housing 16, and only contacts seal housing 16 via seal segment axially facing surface 20.

Seal housing 16 is a stationary retaining structure that positions seal segment 14 from an axially forward position. Seal housing 16 does not rotate with shaft 12 and or reciprocate with seal segment 14. Seal housing 16 can, for example, be formed of a metal substrate coated with a high velocity oxygen fueled (HVOF) coating. The substrate of seal housing 16 can for example be formed of a metal such as aluminum, or of an alloy such as steel. Seal housing 16 contacts seal segment axially facing surface 20 with housing axially facing surface 26. Seal segment axially facing surface 20 and housing axially facing surface 26 are parallel surfaces, and can in one embodiment be strictly radially extending surfaces normal to axis A of shaft 12. Housing axially facing surface 26 extends radially to a minimum radial position defined by housing inner annular surface 28. Housing inner annular surface 28 surrounds but does not contact shaft 12. Housing axially facing surface 26 and housing inner annular surface 28 meet at housing ID corner 30, within region R of seal housing 16. Housing ID corner 30 is discussed in greater detail below with respect to FIG. 3, and is contrasted with prior art structures with respect to FIG. 2.

Inner annular surface 28 of seal housing 16 is separated from shaft 12 by shaft separation distance $d_{shaft}$. Segment step 22 of seal segment axially facing surface 20 is situated a step distance $d_{step}$ from shaft 12. Step corner 24 is consequently situated a radial offset distance $d_{offset}$ from housing ID corner 30, wherein $d_{offset}=d_{step}-d_{shaft}$. Over the course of normal operation of seal assembly 10, shaft 12 can deflect, vibrate, rotate, or translate with respect to seal housing 16, causing shaft separation distance $d_{shaft}$ (and consequently $d_{offset}$) to vary slightly. Housing ID corner 30 is situated radially inboard of step corner 24, such that offset distance $d_{offset}$ represents a distance radially inward from step corner 24 to housing ID corner 30. Increased wear, imbalances, and part failures can occur if step corner 24 is situated radially inboard of housing ID corner 30. In some cases, for example, malpositioning of housing ID corner 30 relative to step corner 24 could cause the seal segment axially facing surface 20 to form uneven wear and damage the seal segment 14 if housing ID corner 30 were to fall radially outward of step corner 24. These failure conditions are avoided by fabricating housing ID corner 30 to strict specifications.

Figure 2:
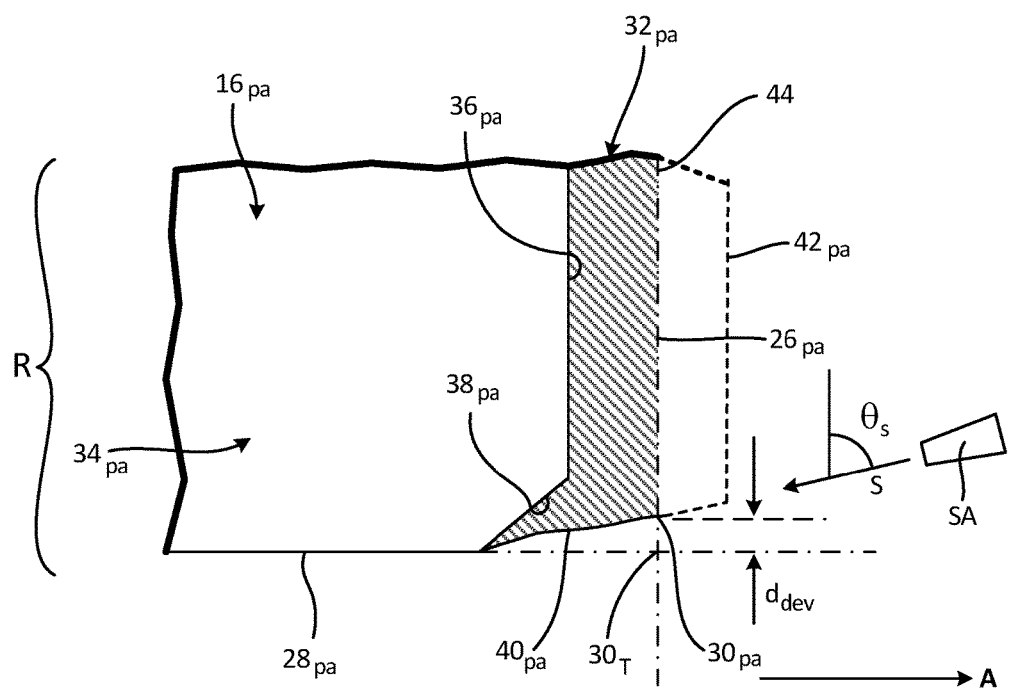
FIG. 2 is a schematic cross-sectional view a prior art design for an edge region of the seal housing of FIG. 1.

FIG. 2 is a cross-sectional view of corner region R of seal housing 16pa. Seal housing 16pa is a prior art design for seal housing 16 featuring a simple chamfered corner. Seal housing 16pa has housing axially facing surface 26pa and housing inner annular surface 28pa, which meet at housing ID corner 30pa, generally as described above. Seal housing 16pa is formed of coating 32pa bonded to substrate 34pa. Substrate 34pa has axially facing substrate surface 36pa, which transitions to housing inner annular surface 28pa via chamfer 38pa. Housing inner annular surface 28pa is uncoated. Coating 32pa defines the entirety of housing axially facing surface 26pa, as well as coating ID surface 40pa near housing ID corner 30pa. In some cases, coating ID surface 40pa can deviate from housing inner annular surface 28pa, causing a shift in the location of housing ID corner 30pa.

Coating 32pa is bonded to substrate 34pa via spray deposition with spray apparatus SA at spray orientation S. Spray orientation S is obtusely angled at spray angle $\theta_S$ with respect to housing axially facing surface 26pa. Spray orientation S is directed partially radially inward, to avoid depositing coating material on housing inner annular surface 28pa. In at least some embodiments, coating 32pa is initially deposited to an excessive thickness out to initial axial coating surface 42pa, and excess coating material deposited is subsequently machined away to produce a finished, smooth surface grind plane 44.

Coating 32pa bonds readily to substrate 34pa along substrate axially facing surface 36pa, but the shallow angle of attack of spray orientation S with respect to chamfer 38pa can cause coating material be partially deflected at chamfer 38pa, resulting in departure of coating ID surface 40pa from the straight cross-section of housing inner annular surface 28pa. In particular, coating ID surface 40pa can deviate from a desired annular profile, such that the actual location of housing ID corner 30pa is offset radially outward from an ideal sharp corner location (labeled $30_T$) by deviation distance $d_{dev}$. Target corner $30_T$ is situated at the intersection of annular surface 28pa and grind plane 40. Deviation distance $d_{dev}$ is a cross-sectional distance between target corner $30_T$ and the actual location of corner 30 at the intersection of coating ID surface 40 and housing axially facing surface 26pa. In some cases, deviation distance $d_{dev}$ can offset housing ID corner 30pa enough to elevate housing ID corner 30pa radially outward of step corner 24, such that radial offset distance $d_{offset}$ is negative (see FIG. 1). In such cases, the acylindrical irregularity of coating ID surface 40pa can cause imbalances in seal assembly 10 and part failures in seal segment 14, in particular.

Some alternative prior art designs of corner structures for seal housings include unchamfered corners at the intersection of annular and axially-facing housing surfaces. These unchamfered designs can suffer from chipping or delamination of coating from axially-facing surfaces. Chamfer 38pa substantially avoids this chipping and delamination. As discussed above, however, chamfer 38pa can produce damaging irregularities in the location of housing ID corner 30 relative to step corner 24.

Figure 3:
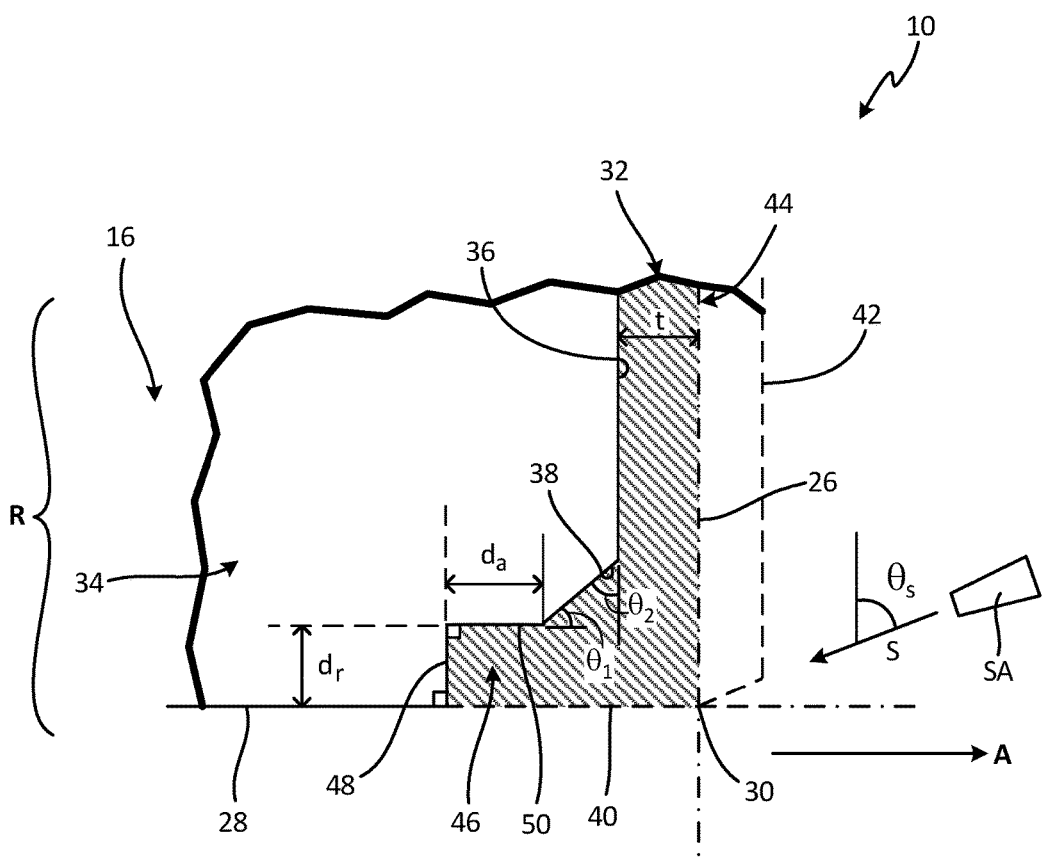
FIG. 3 is a schematic cross-sectional view of a new design of an edge region of the seal housing of FIG. 1.

FIG. 3 is a cross-sectional view of corner region R of seal housing 16 of FIG. 1. Seal housing 16 generally parallels prior art seal housing 16pa, as described above, but has additional corner features to prevent coating ID surface drift that could cause changes in the location of housing ID corner 30. Seal housing 16 has housing axially facing surface 26 and housing inner annular surface 28, which meet at housing ID corner 30. Seal housing 16 includes coating 32 bonded to substrate 34 where seal housing 16 abuts seal segment 14 (see FIG. 1). Substrate 34 has substrate axially facing surface 36 parallel to housing axially facing surface 26, generally as described above with respect to prior art substrate 34pa, except that substrate axially facing surface 36 ends further from housing ID corner 30.

As described similarly with respect to prior art seal housing 16pa of FIG. 2, coating 32 forms axially facing surface 26 and coating ID surface 40. Unlike prior art substrate 34pa, substrate 34 includes notch 46, an annular notch that can, for example, have a rectangular cross-section as illustrated in FIG. 3. Notch 46 is defined by axially facing notch surface 48 and annular notch surface 50. In at least some embodiments axially facing notch surface 48 is perpendicular to axis A and parallel to housing axially facing surface 26, and annular notch surface 50 is perpendicular to axially facing notch surface 48 and consequently parallel to housing inner annular surface 28 in substrate 34. In the illustrated embodiment notch 46 has a radial width of $d_r$ and an axial width of $d_a$. Notch 46 provides a bonding surface for coating 32, thereby avoiding irregular coating build-up along coating ID surface 40, such that housing ID corner 30 aligns with housing inner annular surface 28. Rather than forming a transition between substrate axially facing surface 36 and housing inner annular surface 28 (see FIG. 2), chamfer 38 defines a frustoconical surface connecting substrate axially facing surface 36 and annular notch surface 50. Chamfer 38 thereby provides the aforementioned benefits of reducing chipping and delamination, while notch 46 prevents coating deflection and resulting acylindrical coating shape at housing ID corner 30. Chamfer 38 is defined by chamfer angles $\varphi_1$ and $\varphi_2$. In one embodiment, chamfer angles $\varphi_1$ and $\varphi_2$ are both 45°.

As discussed above with respect to FIG. 2, coating material is deposited on substrate 34 via spray apparatus SA (shown only schematically) aimed obliquely radially inward with respect to axis A, and obtusely with respect to housing axially facing surface 26, at orientation S described by spray angle $\theta_S$. Coating material can be deposited to initial axially facing coating surface 42, and housing axially facing surface 26 formed by machining away excess material to grind plane 44. In the illustrated embodiment, the post-machining thickness of coating 32 along substrate axially facing surface 36 is coating thickness t. In some embodiments, radial notch width $d_r$ and axial notch width $d_a$ are both greater than or equal to coating thickness t to encourage coating material bonding in notch 46.

Spray angle $\theta_S$ is selected to avoid depositing coating material along inner annular surface 28, while providing a shallow angle of attack to minimize spray deflection and encourage coating bonding to substrate 34. Spray angle $\theta_S$ can, for example, be an obtuse angle greater than or equal to 60°. In general, spray angle $\theta_S$ is greater than chamfer angle $\varphi_2$, but less than 90°. Where chamfer angle $\varphi_1$ is 45°, chamfer 38 and spray orientation S are separated by 45° or less, so as to avoid depositing spray material on housing inner annular surface 28.

Although the present description focuses on a corner substrate feature situated at an ID location, a person skilled in the art will recognize that this corner feature can analogously be applied to OD annular corners and to non-cylindrical structures, as well.

The corner feature described herein, with notch 46 and chamfer 38, encourages coating bonding to produce a uniform inner annular surface with housing ID corner 30 aligned with housing inner annular surface 28. Notch 48 and chamfer 38 accordingly reduce the risk of part failures due to misalignment of housing ID corner 30 relative to step corner 24.

Discussion of Possible Embodiments

The following are non-exclusive descriptions of possible embodiments of the present invention.

A seal housing disposed to support an axially facing seal segment, the seal housing comprising: a substrate having an inner annular surface, an axially facing substrate surface, and a corner feature at an intersection of the inner annular surface and the axially facing substrate surface, the corner feature including an annular notch in the inner annular surface, and a chamfer extending from the annular notch to the axially facing substrate surface; and a coating formed on the axially facing substrate surface and into the corner feature of the substrate, and having a coating surface, parallel to the axially facing substrate surface, that terminates at the inner annular surface and abuts the seal segment.

The seal housing of the preceding paragraph can optionally include, additionally and/or alternatively, any one or more of the following features, configurations and/or additional components:

A further embodiment of the foregoing seal housing, wherein the annular notch comprises: an axially facing notch surface extending radially outward from the inner annular surface; and an annular notch surface extending axially towards the chamfer from the axially facing notch surface.

A further embodiment of the foregoing seal housing, wherein the chamfer is a frustoconical surface extending from the annular notch surface to the axially facing substrate surface, and angled radially outward and axially away from the axially facing notch surface.

A further embodiment of the foregoing seal housing, wherein the frustoconical surface is angled at 45° with respect to the annular notch surface and the axially facing substrate surface.

A further embodiment of the foregoing seal housing, wherein the coating surface is separated from the axially facing substrate surface by a coating thickness, and wherein the axially facing notch surface has a radial extent greater than or equal to the coating thickness.

A further embodiment of the foregoing seal housing, wherein the coating surface is separated from the axially facing substrate surface by a coating thickness, and wherein the annular notch surface has an axial extent greater than or equal to the coating thickness.

A method of forming an edge of an annular workpiece, the method comprising: fabricating a substrate having an annular surface, an axially facing substrate surface, and a corner feature at the intersection of the annular surface and the axially facing substrate surface, the corner feature including an annular notch in the annular surface, and a chamfer extending from the annular notch to the axially facing substrate surface; depositing coating material into the corner feature and on the axially facing substrate surface, axially out to at least a target plane parallel to the axially facing substrate surface, via spray deposition at a spray orientation obtuse to the axially facing substrate surface and at least an axial surface of the annular notch; and removing excess coating material beyond the target plane, such that the coating material has a uniform first axial thickness along the axially facing substrate surface, and greater thickness within the corner feature.

The method of the preceding paragraph can optionally include, additionally and/or alternatively, any one or more of the following features, configurations and/or additional components:

A further embodiment of the foregoing method, wherein the annular notch comprises: an axially facing notch surface extending at a right angle from the annular surface; and an annular notch surface extending at a right angle from the axially facing notch surface to the chamfer.

A further embodiment of the foregoing method, wherein the chamfer extends frustoconically from the annular notch surface to the axially facing substrate surface.

A further embodiment of the foregoing method, wherein the spray orientation is angled at more than 60° with respect to the axially facing substrate surface.

A further embodiment of the foregoing method, wherein the chamfer forms a 45° angle with respect to the annular notch surface and the axially facing substrate surface.

A further embodiment of the foregoing method, wherein the spray orientation is angled at less than 45° with respect to the chamfer.

A seal assembly comprising: a rotating shaft; a seal segment situated on and reciprocatable with the rotating shaft, the seal segment having an axially facing seal surface terminating at a first inner radial extent; a seal housing situated adjacent the seal segment and around the rotating shaft, the seal housing comprising: a substrate terminating at a second inner radial extent inboard of the first inner radial extent, the substrate having an annular notch at a corner adjacent the seal segment, the annular notch extending radially outward from the second inner radial extent, inboard and axially forward of a corner chamfer; and a coated surface deposited atop the substrate, covering the annular notch and the corner chamfer, abutting the axially facing seal surface and terminating at the second inner radial extent.

The seal assembly of the preceding paragraph can optionally include, additionally and/or alternatively, any one or more of the following features, configurations and/or additional components:

A further embodiment of the foregoing seal assembly, wherein the seal segment is a gas turbine engine bearing seal.

A further embodiment of the foregoing seal assembly, wherein coating is a high velocity oxygen fuel coating.

A further embodiment of the foregoing seal assembly, wherein the seal segment is formed at least partially of carbon.

A further embodiment of the foregoing seal assembly, wherein the annular notch has a rectangular cross-section.

A further embodiment of the foregoing seal assembly, wherein the substrate comprises: a primary coated axial surface parallel to the axial seal face; an inner annular surface situated at the second inner radial extent; an axially facing notch surface parallel to and inboard of the coated axial surface; an annular notch surface situated parallel to and outboard of the inner annular surface, and extending axially from the axially facing notch surface to the corner chamfer, such that the axially facing notch surface and the annular notch surface together define the rectangular cross-section of the notch.

A further embodiment of the foregoing seal assembly, wherein the seal segment is permitted to displace radially up to a deflection distance with respect to the seal housing.

A further embodiment of the foregoing seal assembly, wherein the deflection distance is less than a radial separation between the first inner radial extent and the second inner radial extent.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal housing disposed to support an axially facing seal segment, the seal housing comprising:
    a substrate having an inner annular surface, an axially facing substrate surface, and a corner feature at an intersection of the inner annular surface and the axially facing substrate surface, the corner feature including an annular notch in the inner annular surface, and a chamfer extending from the annular notch to the axially facing substrate surface; and
    a coating formed on the axially facing substrate surface and into the corner feature of the substrate, and having a coating surface, parallel to the axially facing substrate surface, that terminates at the inner annular surface and abuts the seal segment;
    wherein the annular notch comprises:
        an axially facing notch surface extending radially outward from the inner annular surface; and
        an annular notch surface extending axially towards the chamfer from the axially facing notch surface.

2. The seal housing of claim 1, wherein the chamfer is a frustoconical surface extending from the annular notch surface to the axially facing substrate surface, and angled radially outward and axially away from the axially facing notch surface.

3. The seal housing of claim 2, wherein the frustoconical surface is angled at 45° with respect to the annular notch surface and the axially facing substrate surface.

4. The seal housing of claim 1, wherein the coating surface is separated from the axially facing substrate surface by a coating thickness, and wherein the axially facing notch surface has a radial extent greater than or equal to the coating thickness.

5. The seal housing of claim 1, wherein the coating surface is separated from the axially facing substrate surface by a coating thickness, and wherein the annular notch surface has an axial extent greater than or equal to the coating thickness.

6. A method of forming an edge of an annular workpiece, the method comprising:
    fabricating a substrate having an annular surface, an axially facing substrate surface, and a corner feature at the intersection of the annular surface and the axially facing substrate surface, the corner feature including an annular notch in the annular surface, and a chamfer extending from the annular notch to the axially facing substrate surface;
    depositing coating material into the corner feature and on the axially facing substrate surface, axially out to at least a target plane parallel to the axially facing substrate surface, via spray deposition at a spray orientation obtuse to the axially facing substrate surface and at least an axial surface of the annular notch; and
    removing excess coating material beyond the target plane, such that the coating material has a uniform first axial thickness along the axially facing substrate surface, and greater thickness within the corner feature;
    wherein the annular notch comprises:
        an axially facing notch surface extending at a right angle from the annular surface; and
        an annular notch surface extending at a right angle from the axially facing notch surface to the chamfer.

7. The method of claim 6, wherein the chamfer extends frustoconically from the annular notch surface to the axially facing substrate surface.

8. The method of claim 6, wherein the spray orientation is angled at more than 60° with respect to the axially facing substrate surface.

9. The method of claim 6, wherein the chamfer forms a 45° angle with respect to the annular notch surface and the axially facing substrate surface.

10. The method of claim 9, wherein the spray orientation is angled at less than 45° with respect to the chamfer.

11. A seal assembly comprising:
   a rotating shaft;
   a seal segment situated on and reciprocatable with the rotating shaft, the seal segment having an axially facing seal surface terminating at a first inner radial extent;
   a seal housing situated adjacent the seal segment and around the rotating shaft, the seal housing comprising:
      a substrate terminating at a second inner radial extent inboard of the first inner radial extent, the substrate having an annular notch at a corner adjacent the seal segment, the annular notch extending radially outward from the second inner radial extent, inboard and axially forward of a corner chamfer; and
      a coated surface deposited atop the substrate, covering the annular notch and the corner chamfer, abutting the axially facing seal surface and terminating at the second inner radial extent.

12. The seal assembly of claim 11, wherein the seal segment is a gas turbine engine bearing seal.

13. The seal assembly of claim 11, wherein coating is a high velocity oxygen fuel coating.

14. The seal assembly of claim 11, wherein the seal segment is formed at least partially of carbon.

15. The seal assembly of claim 11, wherein the annular notch has a rectangular cross-section.

16. The seal assembly of claim 15, wherein the substrate comprises:
   a primary coated axial surface parallel to the axial seal face;
   an inner annular surface situated at the second inner radial extent;
   an axially facing notch surface parallel to and inboard of the coated axial surface;
   an annular notch surface situated parallel to and outboard of the inner annular surface, and extending axially from the axially facing notch surface to the corner chamfer, such that the axially facing notch surface and the annular notch surface together define the rectangular cross-section of the notch.

17. The seal assembly of claim 11, wherein the seal segment is permitted to displace radially up to a deflection distance with respect to the seal housing.

18. The seal assembly of claim 17, wherein the deflection distance is less than a radial separation between the first inner radial extent and the second inner radial extent.

\* \* \* \* \*